United States Patent
Chang et al.

(10) Patent No.: US 9,857,240 B2
(45) Date of Patent: Jan. 2, 2018

(54) SYSTEM AND METHOD FOR TEMPERATURE SENSING OF THREE-DIMENSIONAL INTEGRATED CIRCUIT

(71) Applicant: NATIONAL CHENG KUNG UNIVERSITY, Tainan (TW)

(72) Inventors: Soon-Jyh Chang, Tainan (TW); Peng-Yu Chen, Tainan (TW); Kuen-Jong Lee, Tainan (TW); Chung-Ho Chen, Tainan (TW)

(73) Assignee: National Cheng Kung University, Tainan (TW)

( * ) Notice: Subject to any disclaimer, the term of this patent is extended or adjusted under 35 U.S.C. 154(b) by 295 days.

(21) Appl. No.: 14/713,317

(22) Filed: May 15, 2015

(65) Prior Publication Data
US 2015/0369764 A1    Dec. 24, 2015

(30) Foreign Application Priority Data

Jun. 24, 2014  (TW) .............................. 103121776 A

(51) Int. Cl.
*G01K 1/16*  (2006.01)
*G01K 15/00*  (2006.01)

(52) U.S. Cl.
CPC ............. *G01K 15/005* (2013.01); *G01K 1/16* (2013.01)

(58) Field of Classification Search
CPC .......... G01N 5/04; G01N 25/00; G01N 25/72; G01N 33/02; G01G 7/00; G01K 7/02; G01K 7/22; G01K 13/02; G01K 2205/04; G01K 2013/024; G01K 15/005; G01K 1/16; G01K 3/005; G01K 3/10; G01K 7/42; G01K 13/00; H01R 4/023; H01R 4/029; H01R 43/28; B23K 31/02; H02M 1/32; H02M 1/38; H02M 1/53806; A47J 43/287; F16B 2/02; F16B 1/00; F16B 47/00; F16B 2001/0035; F16M 13/02; F16M 13/022; G01F 1/00; H05K 7/20945; F24F 11/0012; F24F 2001/0052; F24F 2011/0093;
(Continued)

(56) References Cited

U.S. PATENT DOCUMENTS

| 6,307,194 | B1 | 10/2001 | Fitzgibbons et al. | |
|---|---|---|---|---|
| 2013/0148402 | A1* | 6/2013 | Chang ..................... | G11C 8/08 365/63 |
| 2014/0253196 | A1* | 9/2014 | Du ...................... | H01L 27/0688 327/202 |

FOREIGN PATENT DOCUMENTS

| CN | 1677668 A | 10/2005 |
|---|---|---|
| TW | 200902946 A | 7/1996 |

* cited by examiner

Primary Examiner — Manish S Shah
(74) Attorney, Agent, or Firm — Rosenberg, Klein & Lee

(57) ABSTRACT

A system and a method for temperature sensing of three-dimensional integrated circuits are revealed. The three-dimensional integrated circuit is formed by stacking of a plurality of chip layers that execute specific functions. The chip layer includes a master layer and at least one slave layer. The master layer is disposed with a master temperature sensor while a first thermal conductive part is arranged at the slave layer where heat is detected. The first thermal conductive part and the master temperature sensor are connected by a thermal conductive structure. Thereby temperature of various points at different chip layers is conducted to the same chip layer by Through Silicon Vias to be measured and calibrated. The design complexity and the implementation cost of the temperature sensing system are significantly reduced.

8 Claims, 3 Drawing Sheets

(58) Field of Classification Search
CPC .... H01C 7/008; H01C 17/00; G01R 31/2642; G01R 31/048; G01R 31/40
See application file for complete search history.

US 9,857,240 B2

SYSTEM AND METHOD FOR TEMPERATURE SENSING OF THREE-DIMENSIONAL INTEGRATED CIRCUIT

BACKGROUND OF THE INVENTION

Fields of the Invention

The present invention relates to a system and a method for temperature sensing of three-dimensional integrated circuits, especially to a system and a method for multiple temperature sensing of a plurality of chip layers of three-dimensional integrated circuits. In the system, temperature of various points at different chip layers is conducted to the same chip layer by Through Silicon Vias (TSVs) to be measured and calibrated. The design complexity and the implementation cost of the temperature sensing system can be reduced significantly.

Descriptions of Related Art

The three-dimensional integrated circuit (3D IC) can solve the problems of two-dimensional system-on-chip (SoC) by Through Silicon Vias (TSVs). However, one of the big challenges facing 3D IC is how to remove the heat generated by various chip layers to keep a high performance chip temperature within the system and reliability constraints and prevent hot spots. Thus, a temperature sensing system is getting important in the 3D IC. The 3D IC includes different circuit types. In order to optimize cost and performance, different chip layers are fabricated by different manufacturing techniques. As a result, different chip layers have different temperature sensors and the design complexity of the temperature sensing system is increased dramatically. Moreover, different temperature sensors have different calibration mechanisms. Additional digital or analogue signals are also required and transmitted by Through Silicon Vias for calibration. Thus the calibration of all temperature sensors in the temperature sensing system is getting quite difficult and a lot of Through Silicon Vias may be required. Thus for companies and researchers dedicated to 3D IC related temperature sensing technology, it is an important issue to invent a temperature sensing system for 3D ICs with low cost and low complexity in which temperature sensors are arranged at different chip layers of 3D IC. Dynamic temperature control mechanism is also used to ensure reliability of the system. Thus temperature variance of the 3D IC caused by changes of temperature, manufacturing processes or voltage can be calibrated by the temperature sensing system.

SUMMARY OF THE INVENTION

Therefore it is a primary object of the present invention to provide a system and a method for temperature sensing of three-dimensional integrated circuits, especially to a system and a method for multiple temperature sensing of three-dimensional integrated circuits (3D IC) formed by stacking of a plurality of chip layers. By the Through Silicon Via (TSV), the temperature of various points at different chip layers is conducted to the same chip layer to be measured and calibrated for reducing the design complexity and the implementation cost of the temperature sensing system.

In order to achieve the above object, a temperature sensing system and a method for three-dimensional integrated circuits of the present invention are provided. The three-dimensional integrated circuit is formed by stacking of a plurality of chip layers each of which executes specific function. The chip layer consists of a master layer and at least one slave layer. A master temperature sensor is set on the master layer and a first thermal conductive part is arranged at the slave layer where users intend to detect heat. The first thermal conductive part and the master temperature sensor are connected by a thermal conductive structure.

In the above system for temperature sensing of three-dimensional integrated circuits, the master layer is disposed with at least one second thermal conductive part connected to the master temperature sensor and the thermal conductive structure.

In the above system for temperature sensing of three-dimensional integrated circuits, the first thermal conductive part 4 and the second thermal conductive part 6 are made from metal.

In the above system for temperature sensing of three-dimensional integrated circuits, the second thermal conductive part is arranged with a slave temperature sensor. The temperature variance of the slave temperature sensor caused by changes of temperature, manufacturing processes or voltage is calibrated by the master temperature sensor.

In the above system for temperature sensing of three-dimensional integrated circuits, the thermal conductive structure is formed by metal processing.

In the above system for temperature sensing of three-dimensional integrated circuits, the thermal conductive structure is formed by Copper Damascene.

In the above system for temperature sensing of three-dimensional integrated circuits, the thermal conductive structure is a through silicon via (TSV).

Moreover, in order to achieve the above object, a method for temperature sensing of three-dimensional integrated circuits of the present invention includes following steps. First arrange a master temperature sensor on a master layer and dispose a first thermal conductive part on a slave layer at the position where heat is detected. Then form a thermal conductive structure for connecting the first thermal conductive part and the master temperature sensor. At last, conduct heat collected by the first thermal conductive part to the master temperature sensor through the thermal conductive structure.

In the above method for temperature sensing of three-dimensional integrated circuits, the master layer is arranged with at least a second thermal conductive part connected to the thermal conductive structure and the master temperature sensor.

In the above method for temperature sensing of three-dimensional integrated circuits, the second thermal conductive part is disposed with a slave temperature sensor. The temperature variance of the slave temperature sensor caused by changes of temperature, manufacturing processes or voltage is calibrated by the master temperature sensor.

The system and the method for temperature sensing of three-dimensional integrated circuits of the present invention uses Through Silicon Vias (TSV) to conduct the temperature of various points at different chip layers to a master layer for measurement and calibration. The TSVs are formed by Copper Damascene utilized in a back-end of semiconductor manufacturing. Thus both the design complexity and the implementation cost of the temperature sensing system are reduced. Moreover, under the assistance of the TSVs, the temperature sensors of the system for temperature sensing of three-dimensional integrated circuits are all arranged at the master layer with the same manufacturing process while heat of each point at slave layers with different manufacturing processes is conducted to a corresponding temperature sensing circuit of the master layer through the TSVs for temperature measurement. Thereby the complexity of the semiconductor manufacturing of three-dimensional integrated circuit is reduced. Furthermore, the TSVs of the present invention are used in the way different from the conventional through silicon vias for heat dissipation. The temperature of the positions at the slave layers to be detected is conducted to the master layer. Thus there is no need to use through silicon vias with large diameter for temperature conduction. Therefore the system for temperature sensing of three-dimensional integrated circuits of the present invention will not occupy too much chip area and the chip size can be minimized significantly. At last, all temperature sensors are disposed on the master layer manufactured by the same process. Thus not only the temperature sensor architecture is convenient and easy to be selected, the multiple temperature sensing mechanism for two-dimensional SoC available now can be used smoothly in the 3D IC integrated system. At the same time, the calibration of respective temperature circuit needs no through silicon vias for signal transmission. The manufacturing cost of the chip is reduced.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

Figure 1:
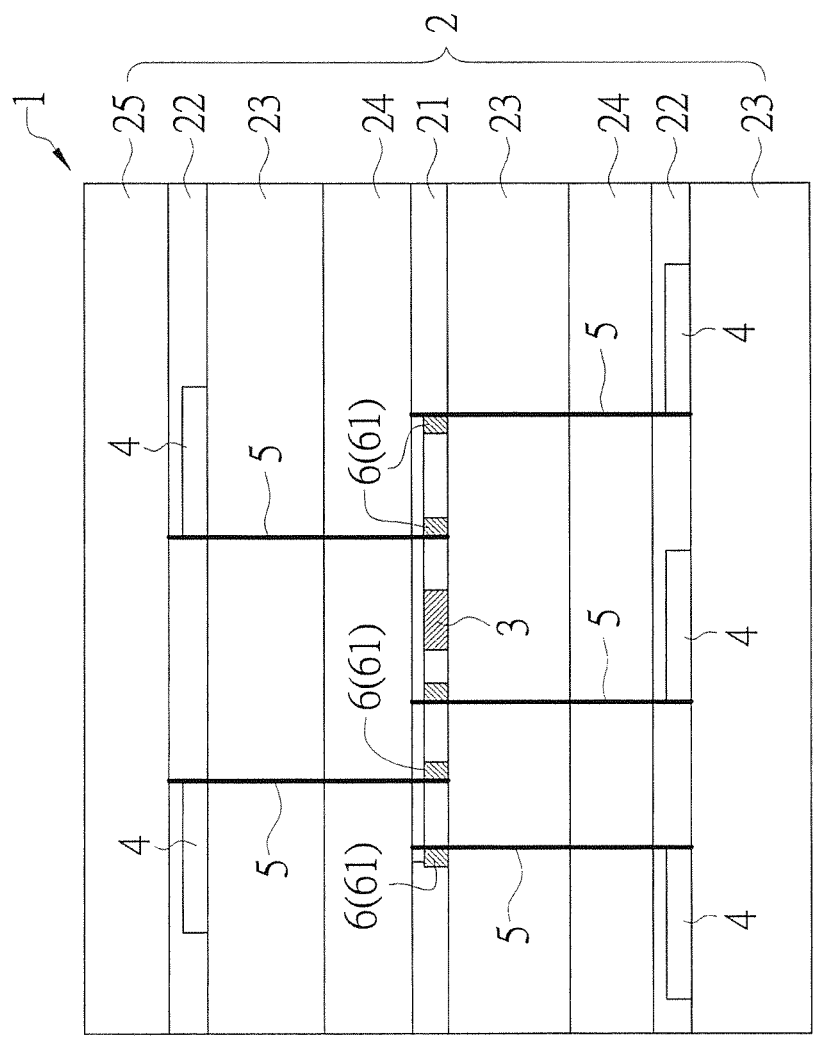
FIG. 1 is a schematic drawing showing structure of an embodiment of a system for temperature sensing of three-dimensional integrated circuits according to the present invention.

Refer to FIG. 1, a schematic drawing showing structure of a system for temperature sensing of three-dimensional integrated circuits according to the present invention is revealed. A three-dimensional integrated circuits (3D IC) 1 is formed by stacking of a plurality of chip layers 2 each of which executes specific function. The chip layer 2 includes a master layer 21 and at least one slave layer 22. A master temperature sensor 3 is disposed on the master layer 21 and a first thermal conductive part 4 is set on the slave layer 22 and located at the position where heat is detected. The master temperature sensor 3 and the first thermal conductive part 4 are connected to each other by a thermal conductive structure 5. In an embodiment of the present invention, the master layer 21 and the slave layer 22 are formed on a substrate 23 respectively while a dielectric layer 24 is stacked between the master layer 21 and the slave layer 22. A protective layer 25 is formed on the outermost layer of the 3D IC 1 for protection of the circuit thereunder.

Moreover, the master layer 21 is set with at least one second thermal conductive part 6 connected to the master temperature sensor 3 and the thermal conductive structure 5.

Furthermore, the first thermal conductive part 4 and the second thermal conductive part 6 are made from metal for conducting heat received.

Figure 2:
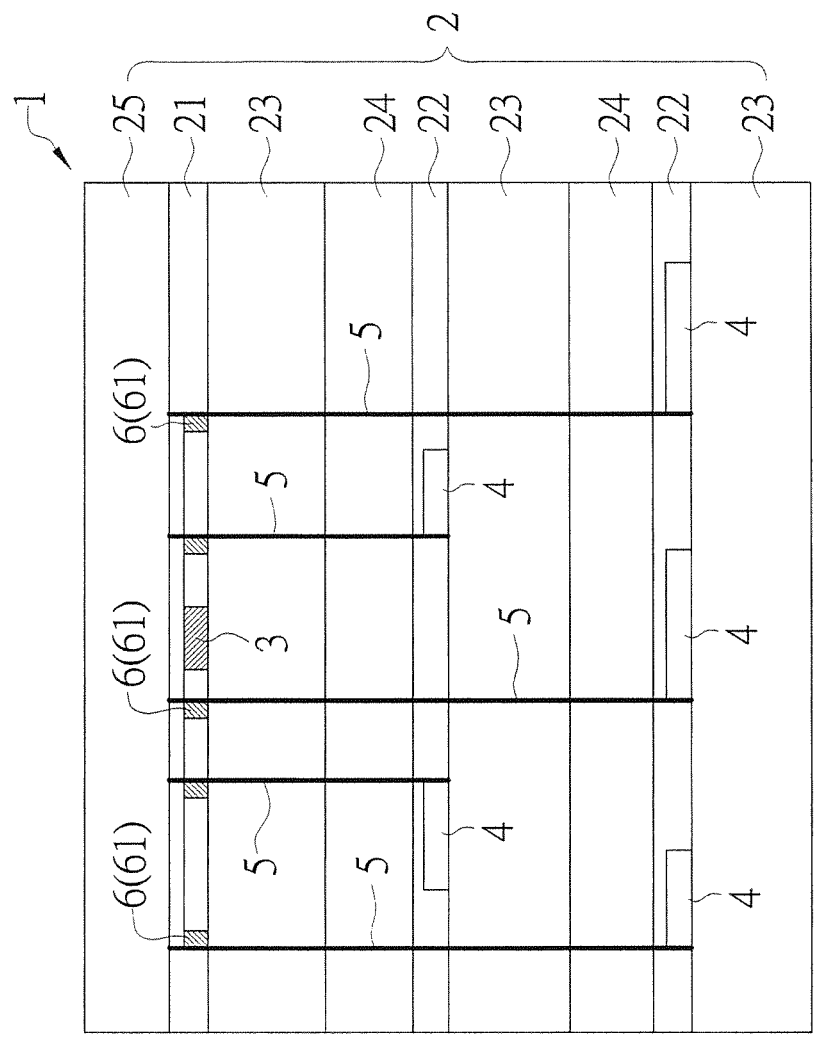
FIG. 2 is a schematic drawing showing structure of another embodiment of a system for temperature sensing of three-dimensional integrated circuits according to the present invention.

In addition, the second thermal conductive part 6 is arranged with a slave temperature sensor 61. The temperature variance of the slave temperature sensor 61 caused by changes of temperature, manufacturing processes or voltage is calibrated by the master temperature sensor 3. In an embodiment of the present invention, a multiple sensing system includes at least one slave temperature sensor located at where heat is detected and a master temperature sensor mounted in an IC and electrically connected to all slave temperature sensors, The temperature variance of the slave temperature sensor caused by changes of temperature, manufacturing processes or voltage is calibrated by the master temperature sensor. Thus the area the temperature sensors required in the integrated chip is significantly reduced and the stability of the temperature control system is increased. The problem of conventional SoC in which the use of temperature sensors is limited due to the large area of the temperature sensor can be solved. The master layer 21 of the present invention is disposed with the temperature sensing system for detecting temperature information transmitted from various positions of the slave layer 22. Refer to FIG. 2, another embodiment is revealed. In this embodiment, the stacking of the chip layers 2 has different pattern. The master layer 21 is staked at last. That means the master layer 21 is stacked after at least one slave layer 22 being stacked. In this embodiment, the master layer 21 is stacked after two slave layers 22 being stacked. By the arrangement of the thermal conductive structure 5, heat form the positions at each slave layer 22 where users intend to detect heat is conducted to the uppermost master layer 21 to be measured and calibrated.

As to the thermal conductive structure 5, it is formed by metal processing. In an embodiment of the present invention, the thermal conductive structure 5 is a through silicon via (TSV) formed by Copper Damascene. Copper is a good conductor of heat and Copper Damascene is the most common and widely utilized process in semiconductor manufacturing technology. The TSV is for electrical interconnection in the 3D IC 1. Thus the temperature sensing system for three-dimensional integrated circuits of the present invention can be used in semiconductor manufacturing without process connection problem.

Figure 3:
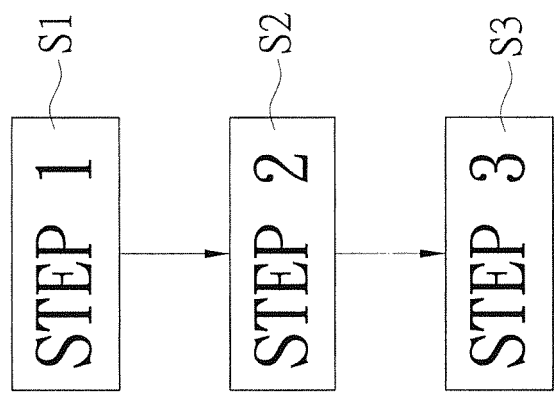
FIG. 3 is a flow chart showing steps of a method for temperature sensing of three-dimensional integrated circuits according to the present invention.

As shown in FIG. 3, a method for temperature sensing of three-dimensional integrated circuits includes following steps.

Step one (S1): disposing a master temperature sensor 3 on a master layer 21 and setting a first thermal conductive part 4 on a slave layer 22 at the position where heat is detected;

Step two (S2): forming a thermal conductive structure 5 that connects the first thermal conductive part 4 and the master temperature sensor 3; and Step three (S3): conducting heat collected by the first thermal conductive part 4 to the master temperature sensor 3 through the thermal conductive structure 5.

Moreover, the master layer 21 is disposed with at least a second thermal conductive part 6 that is connected to the thermal conductive structure 5 and the master temperature sensor 3. The first thermal conductive part 4 collects the heat at the slave layer 22 where heat is detected and then the heat is conducted to the master temperature sensor 3 through the thermal conductive structure 5 and the second thermal conductive part 6 to be detected. Furthermore, the second thermal conductive part 6 is set with a slave temperature sensor 61. The temperature variance of the slave temperature sensor 61 caused by changes of temperature, manufacturing processes or voltage is calibrated by the master temperature sensor 3.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A system for temperature sensing of three-dimensional integrated circuits comprising;
   a plurality of stacked chip layers, each chip layer executing predetermined functions; the plurality of stacked chip layers including a master layer and at least one slave layer;
   a master temperature sensor arranged on the master layer;
   at least one first thermal conductive part disposed on the slave layer positioned to conduct heat generated at the slave layer;
   at least one second thermal conductive part disposed on the master layer and connected to the first thermal conductive part by a thermal conductive structure extending between the slave and master layers; and
   the first thermal conductive part being coupled to the master temperature sensor by the thermal conductive structure and the second thermal conductive part.

2. The system as claimed in claim 1, wherein the first thermal conductive part and the second thermal conductive part are made from metal.

3. The system as claimed in claim 1, wherein the second thermal conductive part is arranged with a slave temperature sensor; temperature variance of the slave temperature sensor caused by changes of temperature, manufacturing processes or voltage being calibrated by the master temperature sensor.

4. The system as claimed in claim 3, wherein the thermal conductive structure is formed by metal processing.

5. The system as claimed in claim 4, wherein the thermal conductive structure formed by Copper Damascene.

6. The system as claimed in claim 5, wherein the thermal conductive structure is a through silicon via (TSV).

7. A method for temperature sensing of three-dimensional integrated circuits comprising:
   disposing a master temperature sensor on a master layer and arranging at least one first thermal conductive part on a slave layer for conducting heat generated at the slave layer;
   disposing at least one second thermal conductive part on the master layer;
   forming a thermal conductive structure extending between the slave and master layers to couple the first thermal conductive part on the slave layer to the second thermal conductive part on the master layer; and
   conducting heat collected by the first thermal conductive part to the master temperature sensor through the thermal conductive structure and the second thermal conductive part.

8. The method as claimed in claim 7, wherein the second thermal conductive part is arranged with a slave temperature sensor; temperature variance of the slave temperature sensor caused by changes of temperature, manufacturing processes or voltage being calibrated by the master temperature sensor.

* * * * *